Sept. 5, 1944.  P. M. PREZIOSI ET AL  2,357,424
CHUCK
Filed March 16, 1943
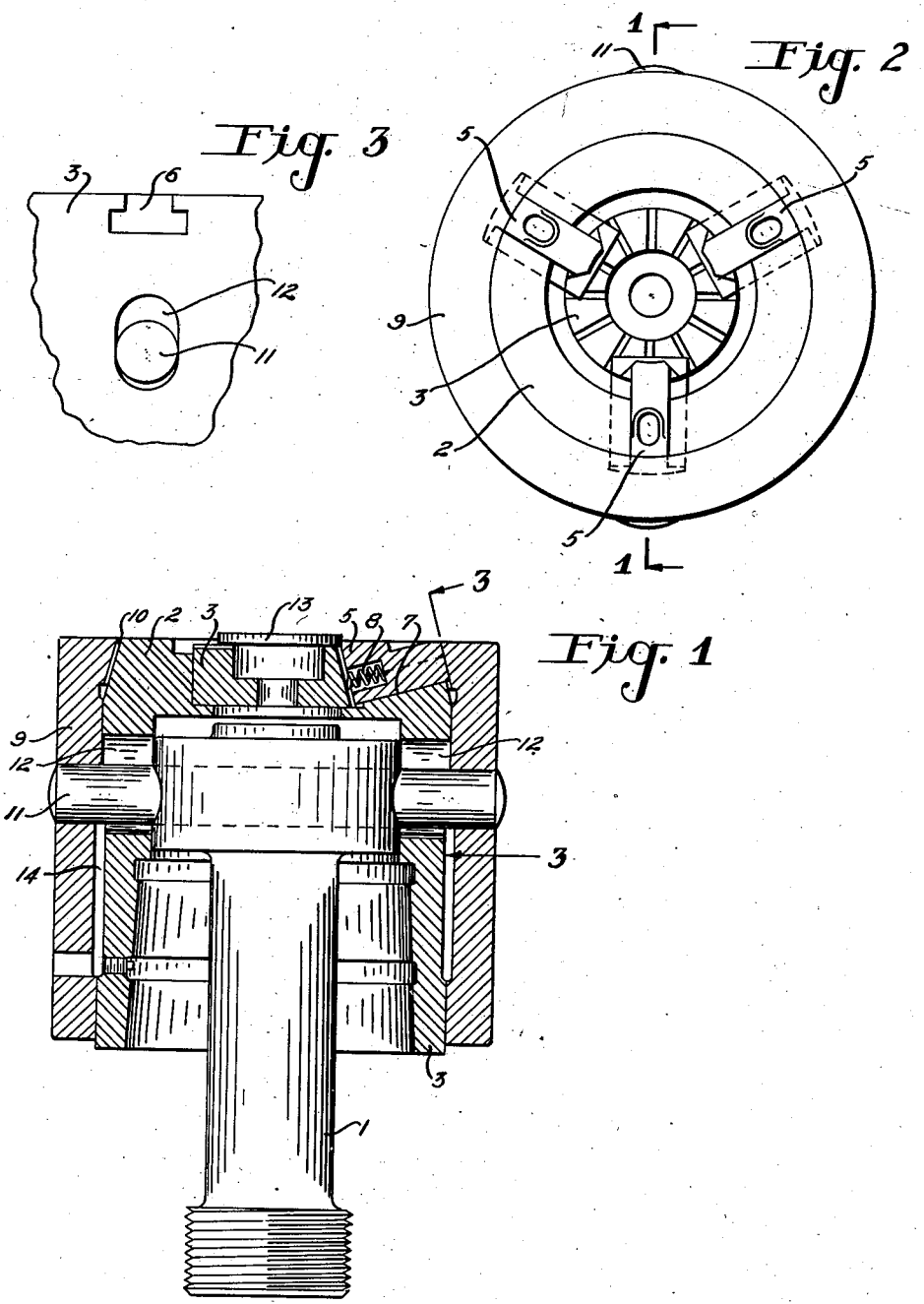
INVENTORS
PETER M. PREZIOSI
JOHN J. SEME
BY Frank H. Harmon
ATTORNEY Patented Sept. 5, 1944

2,357,424

UNITED STATES PATENT OFFICE 2,357,424

CHUCK

Peter M. Preziosi, Cleveland Heights, and John J. Seme, Maple Heights, Ohio, assignors to Jack & Heintz, Inc., Bedford, Ohio, a corporation of Ohio Application March 16, 1943, Serial No. 479,304

2 Claims. (Cl. 279—74)

This invention relates in general to improvements in chucks and has for its primary object to provide a chuck, the jaws of which upon engagement with the work will be free of any tendency to bind and which will apply uniform pressure on the work to insure its proper centering and alignment with respect to the chuck.

Another object is to so improve the construction of the chuck that the work may be more readily and efficiently engaged and released with the minimum effort and in the minimum amount of time.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in vertical section taken through the chuck in engagement with the work.

Figure 2 is a top plan view of the same.

Figure 3 is a view taken along line 3—3 of Figure 1, with the jaw removed, showing the groove in the chuck head for guiding the sliding jaw.

Referring more particularly to the drawing, the chuck is shown as having a shank 1 and cylindrical head 2 recessed to removably receive a work receiving table 3. The head is counterbored to receive three work gripping jaws 5, each of which is maintained within a guide 6 cut in the head so as to be slidable concentrically toward the center of the head along the inclined surface 7 against the action of a compression coil spring 8.

Surrounding the head is a cylindrical clamping ring 9 provided with an interior bevelled surface 10 corresponding to a likewise exterior bevelled surface of the head and the gripping jaws 5. The shank also carries a pin 11 which extends through vertically elongated openings 12 in the head 2 but in snug engagement with the clamping ring 9.

Figures 1 and 2 show the work 13 engaged by the three gripping jaws 5, in which case the clamping ring is adjusted to its lower extremity and binds and forces the gripping jaws inwardly into clamping engagement with the work against the action of springs 8. The clamping ring 9 is also so formed as to provide for a space 14 between it and the head but to bind the outwardly bevelled surface of the lower skirt of the head. Thus, in the adjustment of the clamping ring into clamping engagement with the work, the ring has two bearing surfaces which it engages, namely the bevelled surface at the top of the head and that of the skirt.

A simple relative movement of the ring and head into the position shown in Figure 1 effects a clamping engagement of the gripping jaws with the work as the jaws are forced inwardly and downwardly by reason of the clamping action of the ring as it is pulled downwardly over the head. Likewise, a simple relative movement of the ring and head from the position shown in Figure 1 results in a release of pressure on the clamping jaws and consequently a release of the work.

From the foregoing description it will be appreciated that there has been provided a chuck that is capable of wide variations in size and adjustment and furthermore it will be readily seen that by reason of the improved construction hereinbefore described, a simple push and pull of the shank effects an engagement and release of the clamping jaws with the work.

We claim:

1. In a device of the character described, a chuck having its upper end or head, inclined radially inwardly and its lower end inclined radially outwardly, said chuck head being provided with a plurality of concentrically and equidistantly arranged inverted T-slot guides therein and a work gripping jaw slidably arranged in each guide for clamping engagement with said work, said guides having their bottom surfaces equally inclined downwardly toward the center of said head, a detachable ring open at both ends and adapted for slidably clamping engagement with the head and skirt of said chuck, said ring having its upper inner surface inclined upwardly and radially inwardly to force said correspondingly bevelled jaws equally downwardly and radially inwardly and into equal gripping relationship with the work and equal resilient means for opposing the movement of each jaw, whereby said work is uniformly gripped by each jaw and centered with respect to the center of said head and flush with the surface thereof.

2. In a device of the character described, a chuck head provided with a plurality of concentrically and equidistantly arranged inverted T-slot guides therein and a work gripping jaw slidably positively engaged by each guide to permit movement of said jaw therein radially toward and away from the center of said chuck head only, said guides having their bottom surfaces equally inclined downwardly toward the center of said head, an elongated detachable ring open at both ends and slidably fitted over said head, the outer surface of said head and the inner upper surface of said ring as well as the outer surface of said jaws being correspondingly bevelled so that relative slidable movement between said head and said ring in one direction is adapted to force said jaws equally downwardly and radially inwardly and into equal gripping relationship with the work, the lower, or skirt end of said chuck head being flared outwardly in increased diameter to frictionally engage the lower end of said ring simultaneously with the forcing of said jaws into gripping relationship with said work, and so that relative movement of the ring and head in the other direction is adapted to release said clamping engagement, and resilient means for forcing said jaws out of engagement with said work, an operating shank having a cross pin extending therethrough and through said ring in snug engagement and also extending through a slot in said head, said slot being elongated in a direction parallel to said shank to permit manually exerted relative linear non-rotative sliding movement between said head and said ring.

PETER M. PREZIOSI.
JOHN J. SEME.